US012316064B2

United States Patent
Masuda et al.

(10) Patent No.: US 12,316,064 B2
(45) Date of Patent: May 27, 2025

(54) FLUORESCENCE GUIDE PLATE, AND SOLAR-PUMPED LASER

(71) Applicants: TOYOTA JIDOSHA KABUSHIKI KAISHA, Toyota (JP); TOKAI UNIVERSITY EDUCATIONAL SYSTEM, Tokyo (JP)

(72) Inventors: Taizo Masuda, Yokohama (JP); Masamori Endo, Hiratsuka (JP)

(73) Assignees: TOYOTA JIDOSHA KABUSHIKI KAISHA, Toyota (JP); TOKAI UNIVERSITY EDUCATIONAL SYSTEM, Tokyo (JP)

( * ) Notice: Subject to any disclaimer, the term of this patent is extended or adjusted under 35 U.S.C. 154(b) by 423 days.

(21) Appl. No.: 17/893,822

(22) Filed: Aug. 23, 2022

(65) Prior Publication Data

US 2023/0109743 A1 Apr. 13, 2023

(30) Foreign Application Priority Data

Oct. 7, 2021 (JP) .................................. 2021-165826

(51) Int. Cl.
*H01S 3/09* (2006.01)
*H01S 3/067* (2006.01)
(Continued)

(52) U.S. Cl.
CPC ............ *H01S 3/0915* (2013.01); *H01S 3/067* (2013.01); *H01S 3/06704* (2013.01);
(Continued)

(58) Field of Classification Search
CPC .... H01S 3/0915; H01S 3/067; H01S 3/06704; H01S 3/0675; H01S 3/094034;
(Continued)

(56) References Cited

U.S. PATENT DOCUMENTS

2009/0245294 A1* 10/2009 Alkulov .................. H01S 3/109
372/6
2017/0271836 A1* 9/2017 Masuda ............... H01S 3/0915

FOREIGN PATENT DOCUMENTS

JP 2015-201464 A 11/2015
JP 2017-168662 A 9/2017
(Continued)

*Primary Examiner* — Kinam Park
(74) *Attorney, Agent, or Firm* — Dinsmore & Shohl LLP

(57) ABSTRACT

A fluorescence guide plate includes first and second surfaces, an edge surface connecting a periphery of the first surface with a periphery of the second surface, and a dichroic mirror laminated on the first surface. Fluorescent material is dispersed at least one of inside a space defined by the first surface, the second surface, and the edge surface, on the first surface, or on the second surface. The fluorescence guide plate has a plate-shaped structure made of a material with a higher refractive index than an outside. The fluorescence guide plate is configured such that, when irradiation light enters from the first surface, the fluorescence emitted from the fluorescent material exits from the edge surface. A reflection wavelength band of a normal incident beam reflected by the dichroic mirror lies in a range of wavelengths longer than a peak wavelength of a fluorescence wavelength band of the fluorescent material.

5 Claims, 4 Drawing Sheets

(51) Int. Cl.
  *H01S 3/0915* (2006.01)
  *H01S 3/094* (2006.01)
  *H01S 3/0947* (2006.01)
  *H01S 3/16* (2006.01)
  *H01S 3/213* (2006.01)
  *H01S 3/23* (2006.01)
  *G02B 27/14* (2006.01)

(52) U.S. Cl.
  CPC ...... *H01S 3/0675* (2013.01); *H01S 3/094034* (2013.01); *H01S 3/0947* (2013.01); *H01S 3/168* (2013.01); *H01S 3/213* (2013.01); *H01S 3/2358* (2013.01); *G02B 27/141* (2013.01); *H01S 3/094019* (2013.01)

(58) Field of Classification Search
  CPC ........ H01S 3/0947; H01S 3/168; H01S 3/213; H01S 3/2358; H01S 3/094019
  See application file for complete search history.

(56) References Cited

FOREIGN PATENT DOCUMENTS

| | | |
|---|---|---|
| JP | 2018-018981 A | 2/2018 |
| JP | 6497344 B2 | 4/2019 |
| JP | 2020-065027 A | 4/2020 |

\* cited by examiner

FLUORESCENCE GUIDE PLATE, AND SOLAR-PUMPED LASER

CROSS-REFERENCE TO RELATED APPLICATION

This application claims priority to Japanese Patent Application No. 2021-165826 filed on Oct. 7, 2021, incorporated herein by reference in its entirety.

BACKGROUND

1. Technical Field

The disclosure relates to a fluorescence guide plate, and a solar-pumped laser.

2. Description of Related Art

To use solar energy as one of measures against the global warming issue or other environmental issues, various structures to collect sunlight have been suggested. For example, Japanese Unexamined Patent Application Publication No. 2017-168662 (JP 2017-168662 A), Japanese Unexamined Patent Application Publication No. 2018-018981 (JP 2018-018981 A), and Japanese Unexamined Patent Application Publication No. 2020-065027 (JP 2020-065027 A) suggest the structure of a new solar-pumped laser that uses a condensing mechanism without a lens or a sunlight tracking mechanism. In a solar-pumped laser 10 that includes such a new condensing mechanism, as schematically shown in FIG. 6A, an optical fiber portion 3 including an optical fiber 3a is wound on an edge surface 2c of a fluorescence guide plate 1 in which fluorescent material FM is dispersed in a plate member made of a material with a higher refractive index than the outside. The fluorescent material FM absorbs sunlight SL and emits fluorescence FL. Fluorescence FL emitted from the fluorescent material FM is light in a wavelength band in which the sensitivity of a laser medium is relatively high. The optical fiber 3a includes a core part (indicated by 3c in FIG. 6D) in which a laser medium is dispersed, a clad part (indicated by 3b in FIG. 6D) made of a material that passes fluorescence, a reflector (indicated by 5 in FIG. 6B) that substantially totally reflects light on one end face of the optical fiber 3a, and a reflector (indicated by 4 in FIG. 6B) that passes part of light emitted from the laser medium on the other end face of the optical fiber 3a. In the structure of the solar-pumped laser 10, the fluorescence guide plate 1 exercises the function of collecting sunlight. The solar-pumped laser 10 is configured as follows. When sunlight SL enters from one face 2a of the fluorescence guide plate 1, fluorescence FL emitted from the fluorescent material FM is collected at the edge surface 2c and is exited, and the exited fluorescence FL passes through the clad part 3b of the optical fiber 3a and reaches the core part 3c. The laser medium is excited by the fluorescence FL having reached the core part 3c, with the result that laser oscillation occurs. With the above structure, a voluminous component, such as a condenser lens and a mechanism for tracking the position of the sun, or a mechanism of adjusting the focal position of a condenser lens is not needed. As an example using the thus configured fluorescence guide plate, Japanese Unexamined Patent Application Publication No. 2015-201464 (JP 2015-201464 A) describes a structure in which a plurality of reflection layers is provided around the edge surface of a fluorescence guide plate to propagate fluorescence generated as a result of excitation of fluorescent material inside the fluorescence guide plate caused by sunlight having entered from one surface of the fluorescence guide plate, to a solar cell disposed on the edge surface of the fluorescence guide plate.

SUMMARY

In the fluorescence guide plate, there is room for improvement in further efficiently collecting fluorescence.

The disclosure provides a fluorescence guide plate for collecting light, as in the case of the fluorescence guide plate used in the solar-pumped laser described in JP 2017-168662 A, JP 2018-018981 A, and JP 2020-065027 A, configured to further efficiently concentrate the energy of light applied to the fluorescence guide plate.

The disclosure also provides a fluorescence guide plate, as in the case of the above-described fluorescence guide plate, in which a dichroic mirror is laminated on a receiving surface for irradiation light and a reflection wavelength band of the dichroic mirror is configured to be able to pass irradiation light as much as possible into the plate and to concentrate the energy of light by trapping fluorescence as much as possible in the plate.

The disclosure further provides a solar-pumped laser that uses the above-described fluorescence guide plate.

A first aspect of the disclosure provides a fluorescence guide plate. The fluorescence guide plate includes a first surface, a second surface, an edge surface that connects a periphery of the first surface with a periphery of the second surface, and a dichroic mirror laminated on the first surface. Fluorescent material that absorbs irradiation light applied to the first surface to emit fluorescence is dispersed at least one of inside a space defined by the first surface, the second surface, and the edge surface, on the first surface, or on the second surface. The fluorescence guide plate has a plate-shaped structure made of a material with a higher refractive index than an outside. The fluorescence guide plate is configured such that, when the irradiation light enters from the first surface, the fluorescence emitted from the fluorescent material exits from the edge surface. A reflection wavelength band of a normal incident beam reflected by the dichroic mirror lies in a range of wavelengths longer than a peak wavelength of a fluorescence wavelength band of the fluorescent material.

A second aspect of the disclosure provides a solar-pumped laser. The solar-pumped laser includes the fluorescence guide plate of the first aspect, and an optical fiber wound on the edge surface of the fluorescence guide plate along a peripheral direction of the first surface and the second surface. The optical fiber includes a core part in which a laser medium is dispersed, a clad part of which a surface and an inside are made of a material passing the fluorescence and that has a lower refractive index than the core part, a first reflector configured to reflect all of light emitted from the laser medium on one end face of the optical fiber, and a second reflector configured to pass part of light emitted from the laser medium on the other end face of the optical fiber and reflect the remaining part of the light. The optical fiber is configured such that the fluorescence exited from the edge surface of the fluorescence guide plate passes through the surface of the clad part and reaches the core part, laser light occurs as a result of excitation of the laser medium caused by the fluorescence, and the laser light exits from the other end face of the optical fiber.

According to the aspects of the disclosure, it is possible to further efficiently concentrate the energy of light applied to the fluorescence guide plate at the edge surface. In some embodiments, it is also expected to use sunlight. Implementation of easier laser oscillation and an increase in energy to be extracted as laser light are expected by using the structure of the fluorescence guide plate of the aspect of the disclosure to an optically pumped laser that is excited by irradiation light, such as sunlight.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Firstly, the outline of the present disclosure will be described.

Figure 6A:
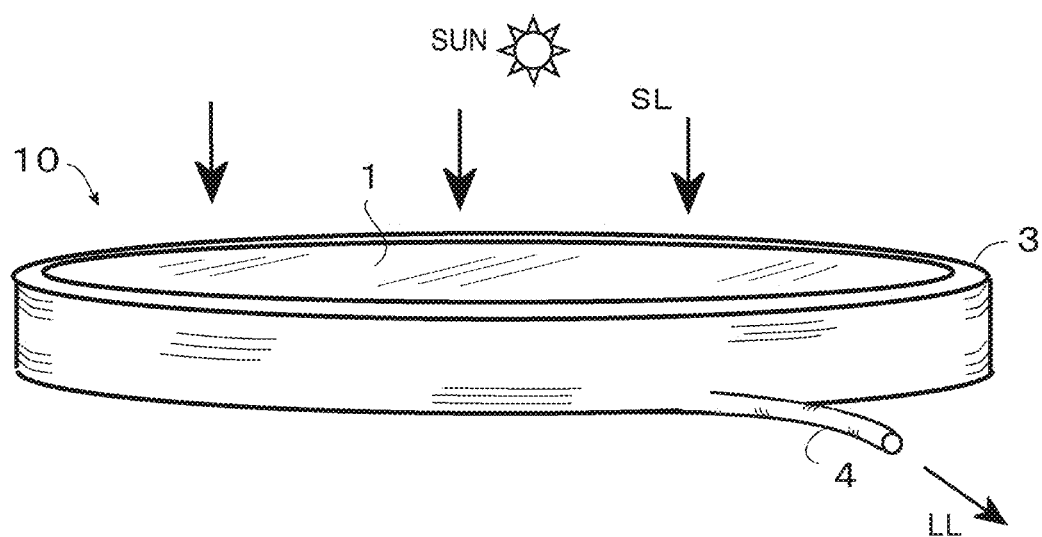
FIG. 6A is a schematic perspective view of a solar-pumped laser using the fluorescence guide plate according to the embodiment of the disclosure.

In a fluorescence guide plate used to collect light in a solar-pumped laser 10 illustrated in FIG. 6A, or the like, fluorescent material dispersed in the plate is excited by light that enters from the surface of the plate into the plate. Fluorescence emitted from the excited fluorescent material is repeatedly reflected on the surfaces of the plate and collected at the edge surface of the plate, and the energy of light applied to the plate is concentrated at the edge surface of the plate and extracted. With the above structure, of fluorescence emitted from the fluorescent material, beams of which the incident angle (the angle formed between the normal direction of the plate and the incident direction of the beam) to the plate surface (the interface between the plate and the outside) is smaller than a critical angle partially pass through the plate surface to cause a loss. As one technique for reducing such fluorescence that passes through the plate surface from the inside of the fluorescence guide plate, it is conceivable that a dichroic mirror (hereinafter, referred to as "DM") is stuck or laminated on the plate surface to reduce the amount of fluorescence, to be emitted from the fluorescent material inside the fluorescence guide plate, that passes through the plate surface. A dichroic mirror is a thin film that has properties to reflect light with specific wavelengths and pass light with the other wavelengths. The above-described "critical angle" is, when there is an interface at which the fluorescence guide plate directly contacts with an air layer, the minimum incident angle of a beam that is totally reflected when the beam enters the interface from the fluorescence guide plate side (hereinafter, the same applies).

As described above, when the DM is disposed on the surface of the fluorescence guide plate to reduce the amount of fluorescence, to be emitted from the fluorescent material in the fluorescence guide plate, that passes through the plate surface, the DM should be prepared such that the wavelength band of light that the DM reflects (reflection wavelength band) overlaps the wavelength band of fluorescence to be emitted from the fluorescent material in the fluorescence guide plate or includes the wavelength band of the fluorescence and beams of which the incident angle to the plate surface is smaller than the critical angle are reflected as much as possible (the reflection wavelength band of the DM is able to be changed by adjusting the composition of the thin film at the time of preparation). In this regard, according to the research related to the present disclosure, it was found that the reflection wavelength band of a DM shifted toward a shorter wavelength side as the incident angle of a beam to the DM increased. In addition, in a structure in which a refractive index of an outside interface of a DM is greater than one as in the case of a fluorescence guide plate in which a DM is laminated, it has been found that the amount of shift of the reflection wavelength band toward a shorter wavelength side resulting from an increase in the incident angle to the DM increases (see FIG. 3). In other words, even when a beam with a wavelength is reflected when entering the DM perpendicularly ((Incident Angle)=0°, normal incident light), a beam having a large incident angle to the DM with the same wavelength is outside the reflection wavelength band and can pass through the DM (fluorescence having passed through the DM becomes a loss). Therefore, when a DM is laminated on the surface of the fluorescence guide plate to reduce the amount of fluorescence that passes through the surface, it is conceivable to set the reflection wavelength band of the DM such that the reflection wavelength band shifted according to the incident angle to the DM overlaps the wavelength band of fluorescence.

Figure 4:
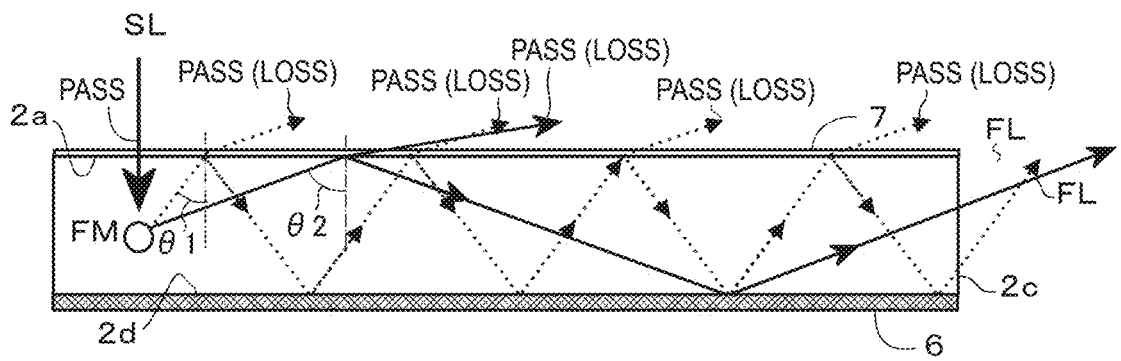
FIG. 4 is a diagram schematically illustrating, in the fluorescence guide plate, irradiation light SL that enters from outside the plate and the optical path of fluorescence FL to be emitted from fluorescent material FM.

Incidentally, irradiation light, such as sunlight, to the fluorescence guide plate ordinarily enters perpendicularly or at a relatively small incident angle to the receiving surface of the fluorescence guide plate. To further increase the energy of light to be concentrated in the fluorescence guide plate, the amount of fluorescence should be increased by exciting the fluorescent material in the plate with more light. For this purpose, the amount of light that enters the fluorescence guide plate is greater the better. Therefore, the wavelength band of light that is able to enter the plate is desirably wide as much as possible. In this regard, ordinarily, the absorption wavelength band (excitation wavelength band) of a fluorescent material overlaps the emission wavelength band (fluorescence wavelength band) of the fluorescent material. Therefore, it is conceivable that a beam having a relatively small incident angle with a wavelength shorter than or equal to the fluorescence wavelength band of the fluorescent material is able to pass through the surface of the fluorescence guide plate. On the other hand, as for fluorescence to be emitted from the fluorescent material in the fluorescence guide plate, as the incident angle of a beam of the fluorescence to the plate surface reduces, the number of times the beam reflects on the plate surface until the beam reaches the edge surface of the plate increases (see FIG. 4), and, each time the beam reflects on the plate surface, part of the beam passes through the plate surface to cause a loss. For this reason, rather than reducing the amount of beams that reflect many times to pass through the plate surface in this way, beams that have a relatively large incident angle to the plate surface and that reflect fewer times are reliably reflected and reach the edge surface of the plate, with the result that it is possible to collect further efficiently, that is, a larger amount of fluorescence at the edge surface of the plate. In other words, it is conceivable that the reflection wavelength band of a beam with a relatively large incident angle to the surface of the fluorescence guide plate overlaps the fluorescence wavelength band. From above, when a DM laminated in the fluorescence guide plate is prepared such that the reflection wavelength band of the DM lies in a range of wavelengths longer than the fluorescence wavelength band of the fluorescent material in a range of a relatively small incident angle from the normal incident angle and overlaps the fluorescence wavelength band of the fluorescent material in a range of a relatively large incident angle, it is understood that fluorescence is able to be further efficiently collected in the fluorescence guide plate.

A first aspect of the disclosure provides a fluorescence guide plate. The fluorescence guide plate includes a first surface, a second surface, an edge surface that connects a periphery of the first surface with a periphery of the second surface, and a dichroic mirror laminated on the first surface. Fluorescent material that absorbs irradiation light applied to the first surface to emit fluorescence is dispersed at least one of inside a space defined by the first surface, the second surface, and the edge surface, on the first surface, or on the second surface. The fluorescence guide plate has a plate-shaped structure made of a material with a higher refractive index than an outside. The fluorescence guide plate is configured such that, when the irradiation light enters from the first surface, the fluorescence emitted from the fluorescent material exits from the edge surface. A reflection wavelength band of a normal incident beam reflected by the dichroic mirror lies in a range of wavelengths longer than a peak wavelength of a fluorescence wavelength band of the fluorescent material.

In the above structure, the fluorescence guide plate is typically a member of a plate-shaped structure in which a transparent material or translucent material having a higher refractive index of light than an outside space, such as quartz glass, polycarbonate resin, acrylic resin, and silicone resin, is used as a base material and a fluorescent material, such as fluorescent pigments and quantum dots, are dispersed in the base material or on the surface (first or second surface) of the plate-shaped structure. The dichroic mirror is a thin film having properties to reflect light with specific wavelengths and passes light with the other wavelengths and is ordinarily a dielectric multilayer film prepared from $SiO_2$, $TiO_2$, or the like. The normal incident beam is a beam that enters in a direction normal to the surface of the dichroic mirror (the incident angle is 0°). The reflection wavelength band of the dichroic mirror is a wavelength band in which the reflectance of light to enter the dichroic mirror increases. The fluorescence wavelength band of the fluorescent material is a wavelength band in which the intensity of fluorescence to be emitted from the fluorescent material significantly increases. The peak wavelength is a wavelength that gives a maximum intensity or local maximum intensity in the fluorescence wavelength band. Light (irradiation light) to be applied to the first surface may be typically sunlight; however, the light is not limited thereto. The light may be light from any light source.

In the fluorescence guide plate of the above aspect, when light, such as sunlight, is applied to the first surface and enters the plate, the fluorescent material dispersed inside or on the first or second surface is excited, with the result that fluorescence is emitted in a radiating direction from each particle of the fluorescent material. Here, the refractive index inside the plate is higher than the refractive index of the outside (ordinarily, air). Accordingly, beams, of fluorescence beams from the fluorescent material, having an incident angle larger than the critical angle to the interface between the plate and the outside (the first surface or the second surface) when reaching the interface, repeat total reflection and reach the edge surface of the plate-shaped structure. Further, fluorescent beams having an incident angle smaller than the critical angle to the interface partially pass through the interface, and the remaining beams repeat reflection and reach the edge surface. Thus, the fluorescent beams reflected or totally reflected on the interface are collected at the edge surface while being trapped in the plate. As a result, the energy of light applied to the wide surface (first surface) of the plate-shaped structure is concentrated at the edge surface of the plate-shaped structure (condensing function).

In the above structure, of fluorescent beams having an incident angle smaller than the critical angle to the interface, beams that pass through the interface do not reach the edge surface to cause an energy loss. Thus, reducing the amount of beams that pass through the interface such that the energy loss is reduced is considered, and, increasing the amount of irradiation light that passes through the interface such that energy to be emitted as fluorescence in the plate is increased is also considered. The disclosure is intended to block passage of fluorescence from the inside of the plate by laminating the dichroic mirror on the first surface that is the receiving surface for irradiation light, while the amount of light that reaches the edge surface is increased by passing a larger amount of irradiation light from the outside of the plate, as described above.

In this regard, as described above, from the research related to the disclosure, it has been found that the reflection wavelength band of a dichroic mirror shifts toward a shorter wavelength side as the incident angle of a beam to the dichroic mirror increases and the amount of shift increases as the refractive index of a medium increases. In other words, when the reflection wavelength band of a normal incident beam in the dichroic mirror matches the fluorescence wavelength band of the fluorescent material, the wavelength band of fluorescent beams having a relatively large incident angle falls outside the reflection wavelength band (shifted toward a shorter wavelength side), and the beams can pass through the dichroic mirror. On the other hand, as the incident angle reduces, the number of times of reflection on the interface until beams reach the edge surface increases, and opportunities that beams pass through the interface increase. Therefore, even when the wavelength band of fluorescent beams having a relatively small incident angle matches the reflection wavelength band, the amount of light that passes through the interface to cause a loss increases by the amount by which the number of times of reflection on the interface increases. Therefore, to increase the amount of fluorescence that reaches the edge surface, it is conceivable that the reflection wavelength band of the dichroic mirror is set in consideration of a shift of the reflection wavelength band toward a shorter wavelength side such that fluorescent beams having a relatively large incident angle are further reliably reflected. As the amount of light that excites fluorescent material increases, the amount of fluorescence to be emitted from the fluorescent material increases. Generally, the excitation wavelength band of fluorescent material overlaps the fluorescence wavelength band, so it is conceivable that light in a wavelength band that covers the fluorescence wavelength band is made to be able to pass through the dichroic mirror as irradiation light to increase the amount of fluorescence of the fluorescent material.

In the structure of the aspect of the disclosure, the reflection wavelength band of the normal incident beam in the dichroic mirror is set so as to lie in a range of wavelengths longer than the peak wavelength of the fluorescence wavelength band of the fluorescent material, as described above. With the above structure, of fluorescent beams heading from the inside of the plate toward the dichroic mirror, the reflection wavelength band of beams having a relatively large incident angle shifts toward a shorter wavelength side from the reflection wavelength band of the normal incident beam and overlaps the fluorescence wavelength band, with the result that a larger amount of beams is reflected and trapped in the plate. Since irradiation light heading from the outside of the plate toward the inside of the plate ordinarily enters the dichroic mirror perpendicularly or at a relatively small incident angle, irradiation light with a wavelength shorter than or equal to the peak wavelength of the fluorescence wavelength band passes through the dichroic mirror because the reflection wavelength band lies in a range of wavelengths longer than the peak wavelength of the fluorescence wavelength band of the fluorescent material. Light in a wide wavelength band including the wavelengths in the excitation wavelength band that overlaps the fluorescence wavelength band enters the plate, and contributes to excitation of the fluorescent material. Therefore, it is possible to increase the amount of fluorescence to be emitted inside the plate.

In the fluorescence guide plate, a reflection film or a reflection mirror that reflects fluorescence from the inside of the plate and irradiation light having passed through the inside of the plate regardless of its incident angle may be laminated or stuck on the surface to which irradiation light is not applied (second surface).

In the above structure, more specifically, the dichroic mirror may be prepared such that the reflection wavelength band of beams having an incident angle larger than a first predetermined angle on the dichroic mirror in a direction from the inside of the fluorescence guide plate toward the first surface overlaps the fluorescence wavelength band of the fluorescent material. The first predetermined angle may be an angle set as needed so as to be smaller than the critical angle. Specifically, the first predetermined angle may be set by adaptation, for example, about 30°; however, the first predetermined angle is not limited thereto. With the above structure, a larger amount of fluorescent beams heading from the inside of the plate toward the first surface and having an incident angle larger than the first predetermined angle to the dichroic mirror is reflected on the dichroic mirror. Thus, a larger amount of fluorescence from the fluorescent material is trapped in the plate and is collected at the edge surface.

In the above structure, the dichroic mirror may be prepared such that the reflection wavelength band of beams having an incident angle larger than a first predetermined angle on the dichroic mirror in a direction from the inside of the fluorescence guide plate toward the first surface includes the fluorescence wavelength band of the fluorescent material. With the above structure, fluorescent beams having an incident angle larger than the first predetermined angle in substantially most of the wavelength band are reflected on the dichroic mirror. Thus, a larger amount of fluorescence from the fluorescent material is trapped in the plate and is collected at the edge surface.

In the above structure, the reflection wavelength band of the dichroic mirror may be set such that beams having an incident angle smaller than a second predetermined angle in a direction from the outside of the fluorescence guide plate toward the first surface and having a wavelength with which the fluorescent material is able to be excited pass through the dichroic mirror. The second predetermined angle may be determined by adaptation and may be the same as the first predetermined angle; however, the second predetermined angle is not limited thereto. As has been already described, since irradiation light, such as sunlight ordinarily comes from above the fluorescence guide plate, it is expected that the incident angle is relatively small. Therefore, since beams having an incident angle smaller than the second predetermined angle with a wavelength with which the fluorescent material is able to be excited, that is, beams in the excitation wavelength band, pass through the dichroic mirror, even when the beams are beams in the fluorescence wavelength band, the beams contribute to excitation of the fluorescent material, and the amount of fluorescence is further increased.

The fluorescence guide plate according to the aspect of the disclosure may be applied to various uses (for example, light guide to a photoelectric cell, or the like) to concentrate and collect the energy of light of a relatively low concentration (low energy intensity), such as sunlight, and use the energy. Alternatively, the fluorescence guide plate may be used as the fluorescence guide plate for the solar-pumped laser described in JP 2017-168662 A or JP 2018-018981 A or the condensing unit described in JP 2020-065027 A. A second aspect of the disclosure provides a solar-pumped laser. The solar-pumped laser includes the fluorescence guide plate of the first aspect, and an optical fiber wound on the edge surface of the fluorescence guide plate along a peripheral direction of the first surface and the second surface. The optical fiber includes a core part in which a laser medium is dispersed, a clad part of which a surface and an inside are made of a material passing the fluorescence and that has a lower refractive index than the core part, a first reflector configured to reflect all of light emitted from the laser medium on one end face of the optical fiber, and a second reflector configured to pass part of light emitted from the laser medium on the other end face of the optical fiber and reflect the remaining part of the light. The optical fiber is configured such that the fluorescence exited from the edge surface of the fluorescence guide plate passes through the surface of the clad part and reaches the core part, laser light occurs as a result of excitation of the laser medium caused by the fluorescence, and the laser light exits from the other end face of the optical fiber.

In the above structure, the single optical fiber may be an optical fiber used in a so-called fiber laser. Particularly, in the optical fiber used in the aspect of the disclosure, the surface and the inside of the clad part are made of a material that passes fluorescence to be emitted from the fluorescent material. Therefore, the fluorescent is configured to enter the outer surface (outer periphery), in a radiating direction, of the clad part that surrounds the core part in the radiating direction (perpendicular to the extending direction (axial direction)) and reach the core part. The single optical fiber may be such that a plurality of optical fibers is coupled in series into a single thread. The laser medium dispersed in the core part of the optical fiber may be a material, such as neodymium ions and ytterbium ions, that is ordinarily used in this field and that is able to achieve laser oscillation of a fiber laser, and the core part may be made of glass (typically, quartz glass) doped with these ions. The first and second reflectors respectively provided at both ends of the optical fiber each may be a mechanism that reflects light of fiber Bragg grating (FBG) or the like ordinarily used in the fiber laser. The reflectance may be set to 99.999% at the first reflector (in the above structure, the phrase "reflect all of light" means that substantially all of light just needs to be reflected and light in an amount of an allowable range is reflected for the purpose of the aspect of the disclosure) and may be set to 98% or the like at the second reflector that is an exit end. Then, for short, the solar-pumped laser according to the aspect of the disclosure is configured such that a single optical fiber that is able to operate as a fiber laser is wound on the edge surface of the fluorescence guide plate.

According to the aspect of the disclosure, by utilizing the findings that the reflection wavelength band of the dichroic mirror shifts toward a shorter wavelength side as the incident angle to the dichroic mirror increases and the amount of shift increases as the refractive index of a medium increases, the fluorescence guide plate for collecting light is able to take a larger amount of irradiation light into the plate and to trap a larger amount of fluorescence in the plate. Therefore, it is possible to further efficiently concentrate the energy of light applied to the fluorescence guide plate at the edge surface. In the structure of the aspect of the disclosure, the fluorescence guide plate absorbs sunlight, converts the wavelength, and then traps light to make it possible to improve energy density, so it is expected to be able to use sunlight. In other words, in the aspect of the disclosure, contradictory matters, that is, "using a large amount of energy by expanding the range of use of sunlight" and "trapping light" both are achieved by utilizing the findings that the reflection wavelength band of the dichroic mirror shifts toward a shorter wavelength side with an increase in incident angle. Implementation of easier laser oscillation and an increase in energy to be extracted as laser light are expected by using the structure of the fluorescence guide plate of the aspect of the disclosure in an optically pumped laser that is excited by irradiation light, such as sunlight.

Figure 1A:
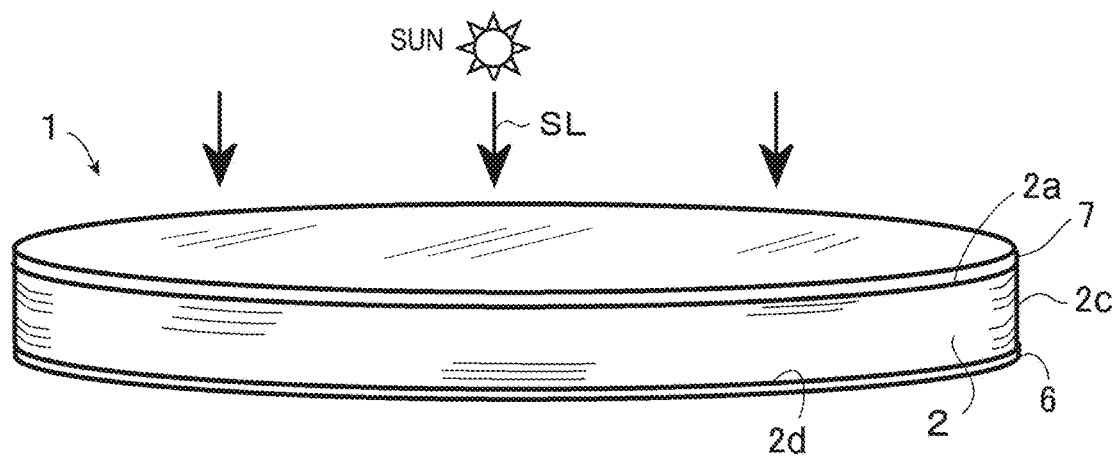
FIG. 1A is a schematic perspective view of a fluorescence guide plate according to an embodiment of the disclosure.
Figure 1B:
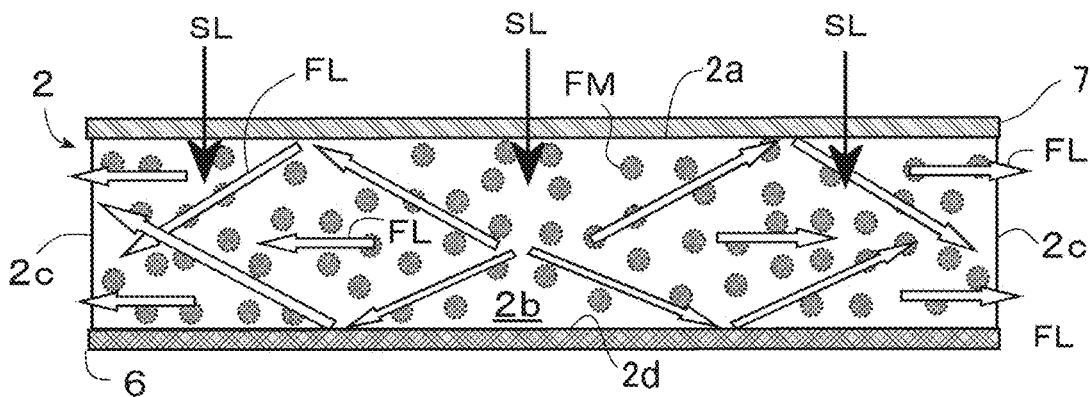
FIG. 1B is a schematic sectional view of the fluorescence guide plate shown in FIG. 1A.

Some embodiments of the disclosure will be described in detail with reference to the accompanying drawings. Like reference signs denote the same portions in the drawings.
Basic Structure and Operation of Fluorescence Guide Plate As shown in FIG. 1A and FIG. 1B, a fluorescence guide plate 1 according to one embodiment of the disclosure includes a body 2 with a plate-shaped structure, defined by a receiving surface 2a (first surface) that receives irradiation light SL, such as sunlight, a back surface 2d (second surface), and an edge surface 2c that connects the light receiving surface 2a with the back surface 2d. A dichroic mirror (DM) 7 is laminated on the receiving surface 2a. A reflection mirror 6 that does not pass light and reflects the light may be applied to the back surface 2d. The fluorescence guide plate body 2 has a structure in which a transparent or translucent material having a higher refractive index of light than an outside space, for example, a resin, such as quartz glass, polycarbonate resin, PMMA, acrylic resin, silicone resin, fluororesin, and urethane resin, as a base material and fluorescent material FM is dispersed in an inner part 2b. The fluorescent material FM may be any material that emits fluorescence FL by absorbing irradiation light SL, such as fluorescent pigments (rhodamine, Lumogen, or the like), quantum dots (methylamine PbI3 (perovskite) quantum dots, PbS quantum dots, CdTe quantum dots, or Si quantum dots). Although not shown in the drawing, the fluorescent material FM does not need to be dispersed in all over the plate inner part 2b and may be dispersed, for example, on the receiving surface 2a or the back surface 2d. The shape of the fluorescence guide plate body 2 in the surface direction is not limited to a circular shape as shown in the drawings, and may be any shape. The DM 7 may be a dielectric multilayer film prepared from $SiO_2$, $TiO_2$, or the like. The DM 7 reflects light in a specific wavelength band and passes light in the other wavelength bands.

In the basic operation of the fluorescence guide plate 1, when irradiation light SL, such as sunlight, passes through the DM 7 and is applied to the light receiving surface 2a, the fluorescent material FM in the plate is excited by the irradiation light SL to emit fluorescence FL. At this time, the fluorescence FL is emitted in a radiating direction from each individual particle of the fluorescent material FM; however, since the refractive index of the base material of the plate-shaped structure is higher than that of the outside (ordinarily, air), when the fluorescent beams FL reach the surface (the receiving surface 2a or the back surface 2b) of the plate-shaped structure, beams having an incident angle larger than the critical angle totally reflect. As a result, the beams are trapped inside the fluorescence guide plate body 2, propagate while repeating reflection, and are collected at the edge surface 2c. For beams having an incident angle smaller than the critical angle as well, since the reflection mirror 6 is disposed on the back surface 2d, the fluorescent beams FL are reflected on the back surface 2d and returned to the plate inner part 2b. On the other hand, since the receiving surface 2a needs to pass irradiation light SL and take the irradiation light SL into the plate inner part, the reflection mirror 6 is not able to be disposed on the receiving surface 2a. However, by disposing the DM 7 prepared so as to pass light in the wavelength band of irradiation light SL, that is, light in the absorption wavelength band of the fluorescent material FM and reflect light in the wavelength band of fluorescence FL of the fluorescent material FM, the fluorescent beams FL that propagate from the plate inner part 2b to the receiving surface 2a are able to be reflected on the DM 7 and returned to the plate inner part 2b. In other words, when the DM 7 is adequately selected, fluorescent beams having an incident angle smaller than the critical angle on the surface of the plate-shaped structure are able to be trapped in the plate inner part 2b and collected at the edge surface 2c while repeating reflection.

Dependence of Reflection Wavelength Band of DM on Incident Angle

Figure 2:
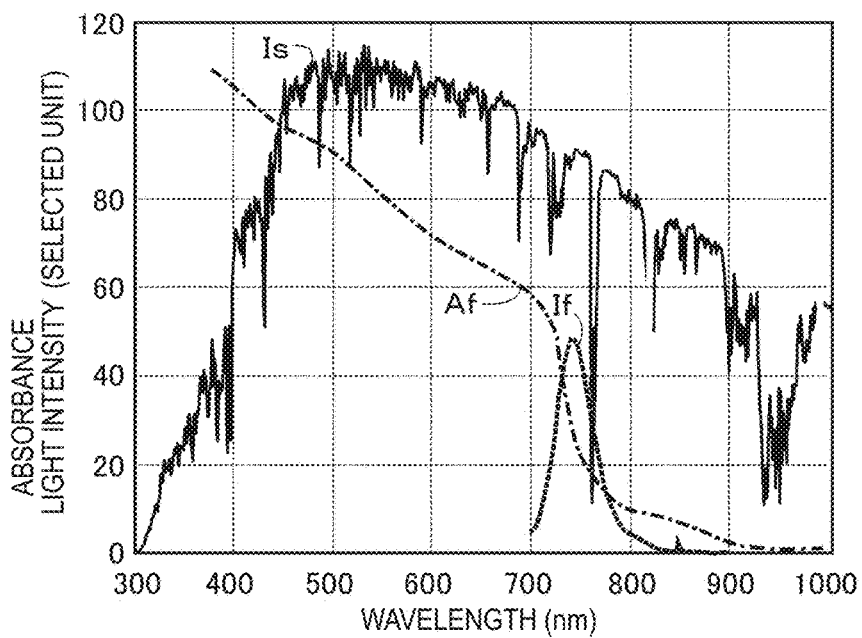
FIG. 2 shows a sunlight spectrum Is, the absorption spectrum Af of fluorescent material, and a fluorescence spectrum If.

When the DM 7 that allows passage of irradiation light SL and that implements a state of reflecting fluorescence FL is laminated on the receiving surface 2a of the fluorescence guide plate 1 as described above, a larger amount of fluorescent beams FL having an incident angle smaller than the critical angle to the receiving surface 2a is able to be collected at the edge surface 2c. However, to further efficiently collect fluorescence at the edge surface 2c as much as possible under the condition that irradiation light is applied at a certain intensity, the wavelength characteristics of the DM are desired to be adjusted such that, of the irradiation light SL, the DM passes a component in the wavelength band of light to be absorbed as wide as possible into the fluorescent material, while a component in the wavelength band of fluorescence as wide as possible from the fluorescent material FM is reflected. However, when sunlight is used as the irradiation light SL, the wavelength band of sunlight lies in a wide range as represented by Is in FIG. 2. Generally, since the wavelength band Af in which fluorescent material absorbs light overlaps the wavelength band If of fluorescence from the fluorescent material. Therefore, in the DM, expanding the wavelength band as wide as possible to pass a component of irradiation light SL to be absorbed into the fluorescent material and expanding the wavelength band as wide as possible to reflect a fluorescent component from the fluorescent material are contradictory requests.

Figure 3:
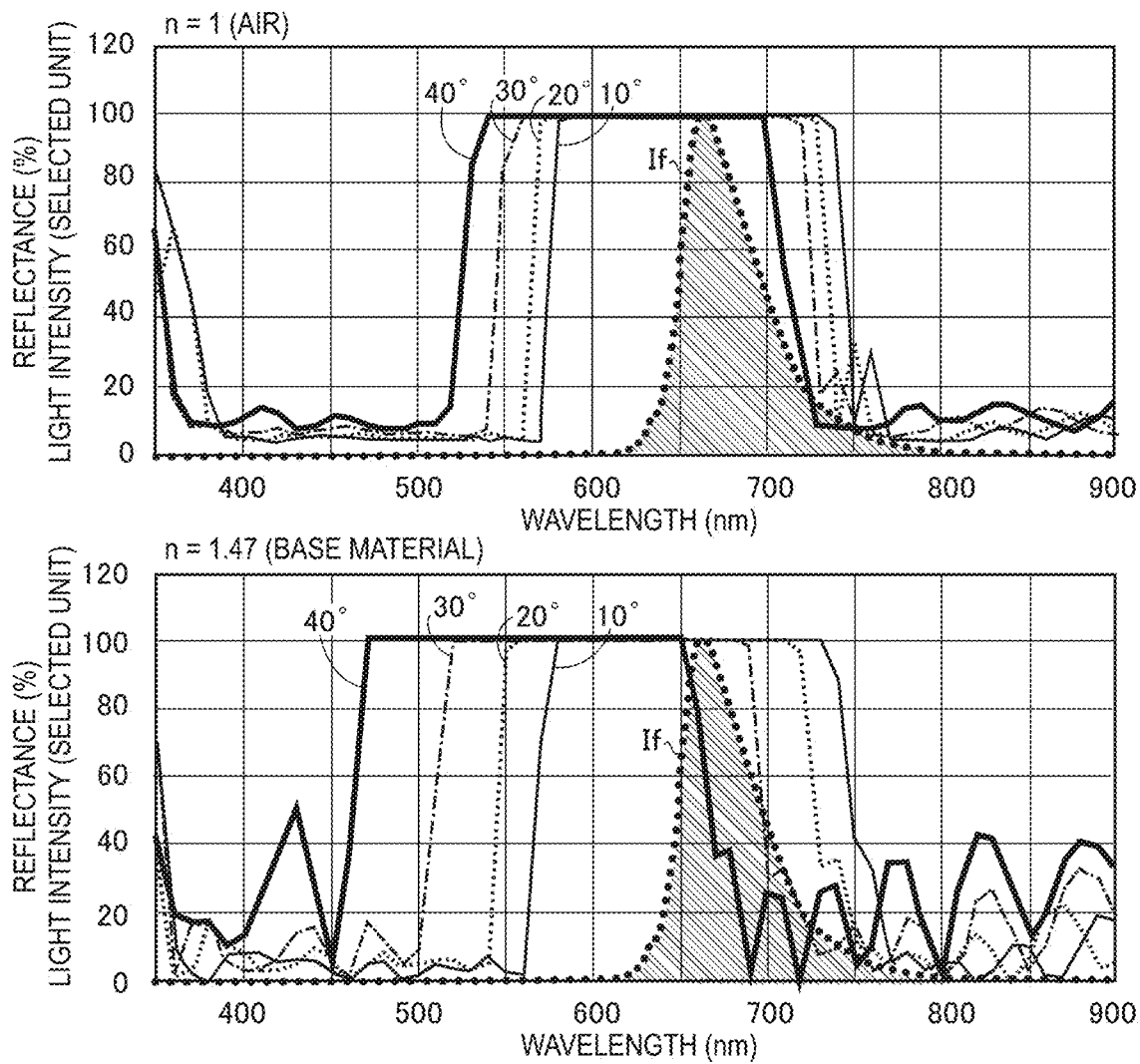
FIG. 3 shows a change in the reflectance of a DM for the wavelength of light (simulation results), in which the top graph shows the case where both sides of the DM are air, the bottom graph shows the case where the entrance side of the DM is a base material with a refractive index of 1.47 and the exit side is air, 10°, 20°, 30°, and 40° each represent the incident angle of a beam to enter the DM, and If is the fluorescence spectrum of a typically used fluorescent material.

Incidentally, as described in the outline, through the research related to the present disclosure, it has been found that the reflection wavelength band of the DM shifts toward a shorter wavelength side as the incident angle of beams to the DM increases and the amount of shift increases as the refractive index of a medium increases. More specifically, according to simulation conducted in the research related to the present disclosure, initially, as illustrated in FIG. 3, it shows that, when the incident angle of beams to the DM is increased from 10° to 40°, the reflection wavelength band of the DM shifts toward a shorter wavelength side. In addition, it has also been found that the amount of shift of the reflection wavelength band toward a shorter wavelength side resulting from an increase in the incident angle of beams to the DM increases as the refractive index of the medium through which incident light propagates increases, as is understood by comparing the top graph and the bottom graph in the drawing. As is understood from the bottom graph of FIG. 3, it shows that, in the case where the refractive index of the medium is equivalent to the refractive index of the material used for the base material of the fluorescence guide plate body 2 (for example: Refractive Index n=1.47), even when the reflection wavelength band of the DM is set so as to cover the fluorescence wavelength band If of a certain fluorescent material in the case where the incident angle of beams is 10°, when the incident angle of beams changes to 40°, the fluorescence wavelength band If of the same fluorescent material can significantly deviate from the reflection wavelength band of the DM (after shifting). In other words, it is understood that, when the DM in the example of the bottom graph in FIG. 3 is applied to the fluorescence guide plate, fluorescent beams having an incident angle up to about 20° are reflected on the DM; however, fluorescent beams having an incident angle larger than or equal to 30° pass through the DM. When the reflection wavelength band of the DM in the case where the incident angle of beams is relatively small is set so as to cover the fluorescence wavelength band of the fluorescent material, irradiation light SL in a band that overlaps the fluorescence wavelength band is also reflected on the DM and does not pass into the plate inner part, and the amount of emission of fluorescence reduces accordingly.

For the fluorescent beams FL to be emitted from the fluorescent material FM in the fluorescence guide plate body 2, as the incident angle of beams to the receiving surface 2a reduces, a loss before reaching the edge surface increases. This is because, as is schematically drawn in FIG. 4, beams, of the fluorescent beams FL to be emitted in a radiating direction from the fluorescent material FM having absorbed irradiation light SL, having a smaller incident angle θ at the time of reaching the receiving surface 2a are reflected on the receiving surface 2a a larger number of times from when the beams are emitted from the fluorescent material FM to when the beams reach the edge surface 2c, and further, part of the beams pass through the receiving surface 2a to cause a loss when the beams are reflected on the receiving surface 2a (as shown in the drawing, beams having an incident angle θ1 (<θ2) are reflected a larger number of times before reaching the edge surface than beams having an incident angle θ2, a loss can increase accordingly). Therefore, when fluorescent beams are reflected by the DM on the receiving surface of the fluorescence guide plate and trapped in the plate, the amount of fluorescence that reaches the edge surface increases when the reflection wavelength band of the DM is set such that beams having a relatively large incident angle to the receiving surface is further reliably reflected and returned into the plate (even when beams having a small incident angle are configured to be reflected on the DM, a loss eventually increases because the number of times of reflection before reaching the edge surface is large).

Setting of Reflection Wavelength Band of DM in Present Embodiment

Figure 5:
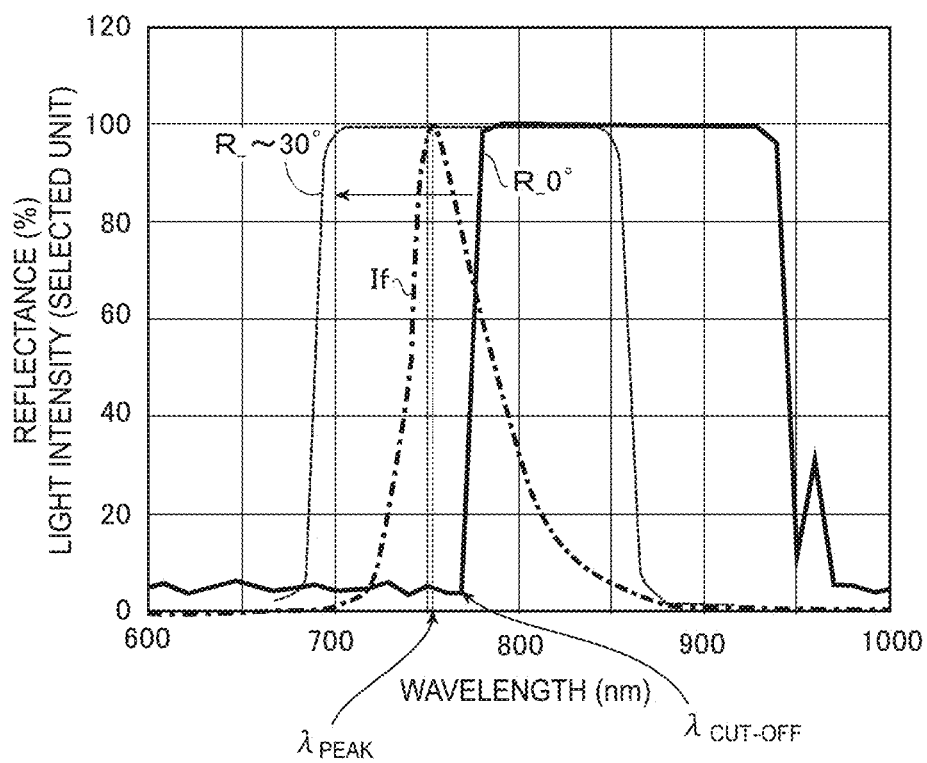
FIG. 5 shows the relationship between the fluorescence spectrum of a fluorescent material and the wavelength characteristics of the reflectance of the DM laminated on a receiving surface for irradiation light of the fluorescence guide plate according to the embodiment of the disclosure.

From the above discussion, in the present embodiment, as illustrated in FIG. 5, the DM laminated on the receiving surface is prepared such that the reflection wavelength band (R_0°) for the normal incident beam lies in a range of wavelengths longer than the fluorescence wavelength band of the fluorescent material, specifically, a lower limit (cut-off wavelength $\lambda_{cut-off}$) of the reflection wavelength band of the normal incident beam is set in a range of wavelengths longer than the peak wavelength $\lambda_{peak}$ in the fluorescence wavelength band. With the above structure, for fluorescent beams from the fluorescent material in the plate inner part 2b, the reflection wavelength band of the DM for beams having a relatively large incident angle to the receiving surface shifts toward a shorter wavelength side than the reflection wavelength band R_0° of the normal incident beam. As a result, the width of the reflection wavelength band of the DM, which overlaps the fluorescence wavelength band If of fluorescent beams from the fluorescent material, increases or, as in the case of R to 30°, the reflection wavelength band of the DM covers the fluorescence wavelength band If. Thus, beams having a relatively large incident angle to the receiving surface (having a smaller number of times of reflection before reaching the edge surface) are further reliably reflected on the DM and trapped in the plate inner part. Therefore, a larger amount of fluorescent beams is able to reach the edge surface. On the other hand, for irradiation light SL to be applied to the receiving surface, ordinarily, sunlight or the like comes at a relatively small incident angle from above to the receiving surface. Therefore, when the reflection wavelength band of the DM for beams having a small incident angle lies in a range of wavelengths longer than the fluorescence wavelength band of the fluorescent material, an irradiation light component in a wide wavelength band, including light in a band that overlaps the fluorescence wavelength band, enters the plate inner part and is able to increase the excitation amount of the fluorescent material, so an increase in the amount of fluorescence generated is expected.

In the embodiment, the incident angle of irradiation light is ordinarily about 0° to 30° when, for example, the irradiation light is sunlight or the like. The number of times a fluorescent beam in the fluorescence guide plate reflects on the receiving surface before the fluorescent beam reaches the edge surface after being emitted from the fluorescent material in the case where the incident angle is 30° is about ⅓ of the number of times of reflection in the case where the incident angle is 10°. Therefore, the reflection wavelength band of the normal incident beam may be prepared such that a fluorescent beam is reflected on the DM when, for example, the incident angle is larger than or equal to 30° and passes through the DM when the incident angle is smaller than 30°.

Uses of Fluorescence Guide Plate

The fluorescence guide plate of the present embodiment is able to concentrate and collect the energy of irradiation light by converting irradiation light, such as sunlight, to fluorescence in the plate and collecting the fluorescence at the edge surface of the plate. The fluorescence guide plate of the present embodiment may be used to supply light to a solar cell or a photoelectric converter.

The fluorescence guide plate of the present embodiment is usable as a fluorescence guide plate for the solar-pumped laser described in JP 2017-168662 A, JP 2018-018981 A, or JP 2020-065027 A. In a solar-pumped laser 10 that uses the fluorescence guide plate of the present embodiment, as shown in FIG. 6A to FIG. 6D, an optical fiber portion 3 made of a single optical fiber 3a is wound on the edge surface around the substantially disk-shaped fluorescence guide plate 1 (for the sake of illustration, the structure of each portion in the drawings is schematically drawn, and the scale ratio of an actual device can be significantly different.

Figure 6B:
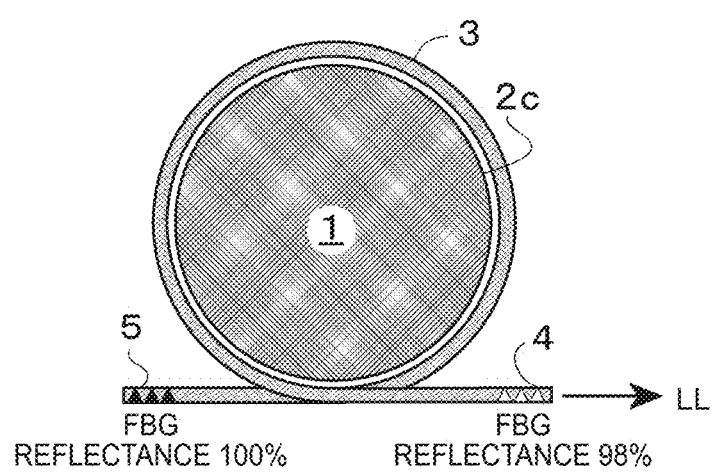
FIG. 6B is a schematic plan view of the solar-pumped laser.
Figure 6D:
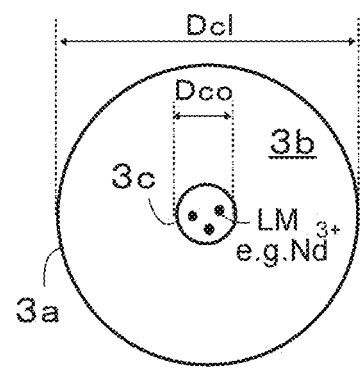
FIG. 6D is a schematic sectional view of an optical fiber of the solar-pumped laser according to the embodiment.
Figure 6C:
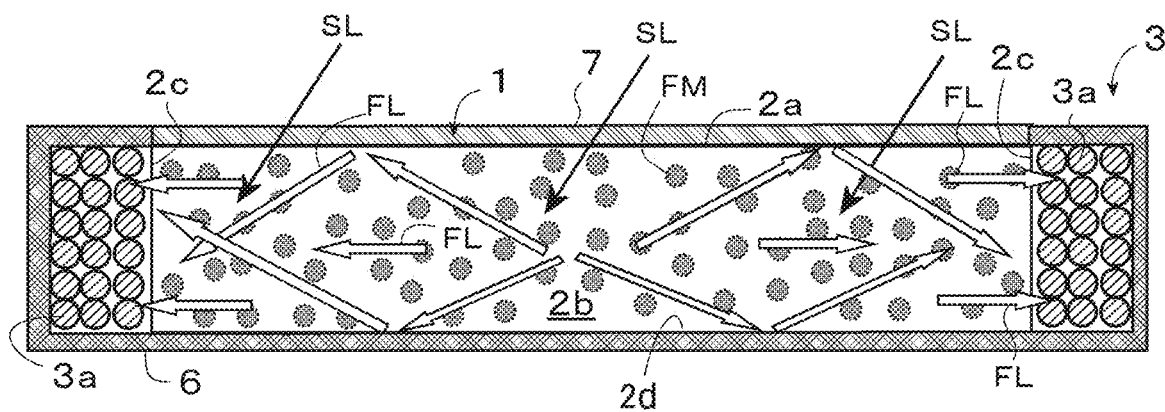
FIG. 6C is a schematic sectional view of the solar-pumped laser.

In the structure shown in FIG. 6A to FIG. 6C, more specifically, as illustrated in FIG. 1A and FIG. 1B, the fluorescence guide plate 1 is defined by the sunlight receiving surface 2a (surface) that receives sunlight SL, the back surface, and the edge surface 2c that connects the sunlight receiving surface 2a with the back surface, and is made of a material in which the fluorescent material FM is dispersed and that has a higher refractive index of light than an outside space. The fluorescent material FM may be particularly a material that absorbs sunlight to emit fluorescence in the absorption wavelength band of a laser medium doped in the core part of the optical fiber 3a (described later). The dimensions of the fluorescence guide plate 1 and the area ratio between the sunlight receiving surface 2a and the edge surface 2c are designed such that the conditions of laser oscillation are satisfied as will be described later.

In the optical fiber portion 3, the optical fiber 3a is an optical fiber usable for a fiber laser and may be configured such that, as shown in the drawing, the single optical fiber 3a is wound on the edge surface 2c of the fluorescence guide plate 1 along the circumferential direction of the fluorescence guide plate 1. The optical fiber 3a may be configured such that the single optical fiber 3a is wound on the edge surface 2c of the fluorescence guide plate 1 multiple times, and the optical fiber 3a may be configured such that the single optical fiber 3a is densely wound (such that adjacent surfaces are in contact with each other) on the edge surface 2c of the fluorescence guide plate 1. As shown by the sectional view schematically drawn in FIG. 6D, the optical fiber 3a may have a structure such that the core part 3c made of a glass material doped with the laser medium LM is surrounded on its outer periphery by a clad part made of a glass material having a lower refractive index than the core part 3c, and a Fabry-Perot resonator may be configured by providing reflectors at both ends 4, 5 of the optical fiber 3a to reflect light that propagates in the optical fiber (at least a component in the wavelength band of light to be emitted from the laser medium). A system ordinarily used in a fiber laser, for example, fiber Bragg grating (FBG), may be adopted as the reflectors. The reflectance of each of the reflectors is adjusted so as to pass part of light that propagates in the optical fiber at the end part 4 that is the exit end for laser light. Specifically, the reflectance may be adjusted to 99.999% at the end part 5 for reflecting all of light (since excitation light does not need to be entered from the end part, it is not necessary to pass excitation light) and to 98% or the like at the end part 4 on the side where laser light is extracted. Particularly, in the solar-pumped laser 10 of the present embodiment, since fluorescence that exits from the edge surface 2c of the fluorescence guide plate 1 is caused to enter from the outer peripheral surface of the wound optical fiber 3a, the surface of the clad part is set to an uncoated state or uses a material that passes light with a wavelength of fluorescence of the fluorescent material dispersed in the fluorescence guide plate 1 as the material of coating when coated. The clad part may be made up of a plurality of layers. The other components, conditions, and operation of the solar-pumped laser 10 may be similar to those of JP 2017-168662 A, JP 2018-018981 A, and JP 2020-065027 A.

Although the above description has been made in relation to the embodiment of the disclosure, many modifications and changes can be easily made by persons skilled in the art, and the disclosure is not limited to only the embodiment illustrated above. It is apparent that the disclosure is applicable to various devices without departing from the concept of the disclosure.

What is claimed is:

1. A fluorescence guide plate comprising:
a first surface;
a second surface;
an edge surface that connects a periphery of the first surface with a periphery of the second surface; and
a dichroic mirror laminated on the first surface, wherein:
fluorescent material that absorbs irradiation light applied to the first surface to emit fluorescence is dispersed at least one of inside a space defined by the first surface, the second surface, and the edge surface, on the first surface, or on the second surface;
the fluorescence guide plate has a plate-shaped structure made of a material with a higher refractive index than an outside of the fluorescence guide plate;
the fluorescence guide plate is configured such that, when the irradiation light enters from the first surface, the fluorescence emitted from the fluorescent material exits from the edge surface; and
a reflection wavelength band of a normal incident beam reflected by the dichroic mirror lies in a range of wavelengths longer than a peak wavelength of a fluorescence wavelength band of the fluorescent material.

2. The fluorescence guide plate according to claim 1, wherein a reflection wavelength band of a first beam reflected by the dichroic mirror overlaps the fluorescence wavelength band of the fluorescent material, the first beam being a beam of which an incident angle is larger than a first predetermined angle in a direction from an inside of the fluorescence guide plate toward the first surface.

3. The fluorescence guide plate according to claim 2, wherein the reflection wavelength band of the first beam reflected by the dichroic mirror includes the fluorescence wavelength band of the fluorescent material.

4. The fluorescence guide plate according to claim 1, wherein the reflection wavelength band of the dichroic mirror is set such that a second beam passes through the dichroic mirror, the second beam being a beam of which an incident angle is smaller than a second predetermined angle in a direction from an outside of the fluorescence guide plate toward the first surface, and the second beam being a beam with a wavelength at which the fluorescent material is able to be excited.

5. A solar-pumped laser comprising:

the fluorescence guide plate according to claim 1; and an optical fiber wound on the edge surface of the fluorescence guide plate along a peripheral direction of the first surface and the second surface, wherein:

the optical fiber includes a core part in which a laser medium is dispersed, a clad part of which a surface and an inside are made of a material passing the fluorescence and that has a lower refractive index than the core part, a first reflector configured to reflect all of light emitted from the laser medium on one end face of the optical fiber, and a second reflector configured to pass part of light emitted from the laser medium on the other end face of the optical fiber and reflect the remaining part of the light; and the optical fiber is configured such that the fluorescence exited from the edge surface of the fluorescence guide plate passes through the surface of the clad part and reaches the core part, laser light occurs as a result of excitation of the laser medium caused by the fluorescence, and the laser light exits from the other end face of the optical fiber.

* * * * *